US005659241A

United States Patent [19]
Horiuchi et al.

[11] Patent Number: 5,659,241
[45] Date of Patent: Aug. 19, 1997

[54] DC/DC CONVERTER AND AUDIO DEVICE INCORPORATING THE SAME

[75] Inventors: Sachito Horiuchi; Kengo Adachi; Hiroaki Ando, all of Ukyo-ku, Japan

[73] Assignee: Rohm Co., Ltd., Kyoto, Japan

[21] Appl. No.: 575,961

[22] Filed: Dec. 20, 1995

[30] Foreign Application Priority Data

Dec. 28, 1994 [JP] Japan .................... 6-338518

[51] Int. Cl.$^6$ .................... G05F 1/10; G05F 1/40
[52] U.S. Cl. .................... 323/222; 323/282
[58] Field of Search .................... 323/222, 224, 323/282, 285, 288; 363/21, 23, 25

[56] References Cited

U.S. PATENT DOCUMENTS

| | | | |
|---|---|---|---|
| 4,644,458 | 2/1987 | Harafuji et al. | 363/65 |
| 4,845,605 | 7/1989 | Steigerwald | 363/21 |
| 4,903,181 | 2/1990 | Seidel | 363/16 |
| 5,440,223 | 8/1995 | Hayasaki | 323/282 |
| 5,479,088 | 12/1995 | Hayakawa et al. | 323/282 |
| 5,495,164 | 2/1996 | Heng | 323/222 |
| 5,565,762 | 10/1996 | Ishikawa et al. | 323/222 |

*Primary Examiner*—Adolf Berhane
*Attorney, Agent, or Firm*—Fay, Sharpe, Beall, Fagan, Minnich & McKee

[57] ABSTRACT

A DC/DC converter including a MOS transistor which is inserted in parallel with respect to a load and between a power source feeding line connected from a battery to the load and a ground line. the converter also has a first control circuit which generates a power of a boosted voltage via switching of the MOS transistor, receives the power of boosted voltage and controls the boosted voltage so as to be at a predetermined constant value in response to the boosted voltage. A bipolar transistor is inserted in parallel with the MOS transistor. A second control circuit receives power from the battery and causes switching of the bipolar transistor to generate a power of boosted voltage. When the boosted voltage is lower than an operable voltage of the first control circuit, the second control circuit is operated, and when the boosted voltage is equal to or more than the operable voltage, the operation of the second control circuit is stopped.

10 Claims, 1 Drawing Sheet

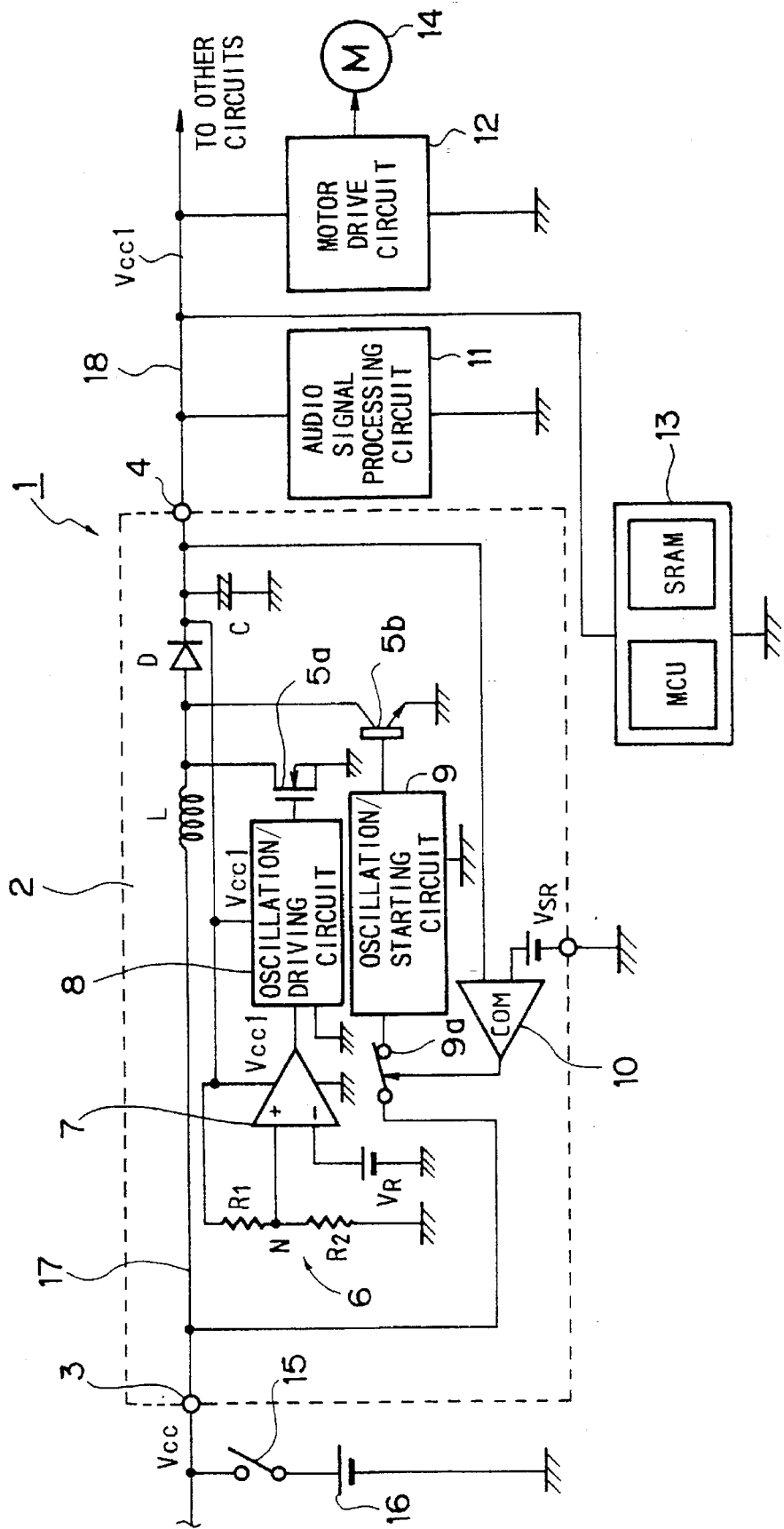

DC/DC CONVERTER AND AUDIO DEVICE INCORPORATING THE SAME

BACKGROUND OF THE INVENTION

1. Field of the Invention

The present invention relates to a DC/DC converter and an audio device incorporating the same, and, more specifically, relates to a DC/DC converter used in a power source circuit which produces power source voltage by boosting a voltage corresponding to a single dry battery, or the like, for audio devices driven by a single dry battery, or the like, which are such as a portable radio recever, a portable CD player and a portable magnetic tape player. The present invention also relates to a DC/DC converter which is easily manufactured and further permits reduction in power consumption.

2. Background Art

The portable radio receiver, the portable CD player and the portable magnetic tape player are usually driven by a dry battery and the number of dry batteries used therefor is mostly one or two. Therefore, the power source voltage therein is limited up to only about 1.2 V or about 2.4 V. Moreover, an audio device, such as a portable CD player and portable magnetic tape player, incorporates a motor therein and further includes a control circuit constituted by a microcontroller (MCU) or a microcomputer (MPU) and a ROM and the like which operates many kinds of circuits in response to many kinds of operating signals.

The operating voltage of the control circuit constituted by the microcontroller or the microcomputer and the ROM and the like is usually at about 3 V~5 V. Further, an audio signal processing circuit is usually driven by a power source voltage of about 2.4 V~3.5 V. In particular, the motor driving circuit for these types of devices requires a higher voltage equal to or more than about 3.5 V, because such a circuit uses a MOS transistor in order to reduce the power consumption therein. For this reason, the power source circuit used in these types of devices is provided with a DC/DC converter which produces a higher predetermined power source voltage by boosting a voltage of about 1.5 V.

Now, the audio devices such as portable CD players and portable magnetic tape players are required to be driven for a long time, and moreover are desired to be driven only by a single dry battery. In order to realize the long time drive it is important to reduce the power consumption in their inner circuits, and until now circuits which are driven at a low voltage and with a low power have been developed and used for the respective devices.

Further, as one of the countermeasures for reducing the power consumption in the power source circuit for these types of devices, a great importance is placed on the reduction of power consumption during a no load period wherein even when the device is in an operable condition substantially no current flows through the load. In order to suppress power consumption during the no load period, major circuits such as a DC/DC converter in the power source circuit are usually constituted by CMOS circuits. With this measure the power consumption during the no load period can be reduced in comparison with a DC/DC converter constituted by bipolar transistors, because the driving current caused flowing through the gate electrode of a MOS transistor is far less than that caused flowing through the base of a bipolar transistor.

However, except for CMOS transistors which are manufactured by a special transistor manufacturing process effective for reducing the operating voltage of the transistors, the operating threshold voltage of CMOS transistors in a DC/DC converter constituted by a usual CMOS circuit is higher than that of a bipolar transistor. For this reson it is difficult to operate a DC/DC converter constituted by such a CMOS circuit with the voltage determined by a single dry battery or the like.

One of DC/DC converters for these types of devices which is also designed to reduce the power consumption is disclosed in a copending U.S. patent application Ser. No. 08/449,830 field on May 24, 1995 now U.S. Pat. No. 5,565,762, which is incorporated herein by reference.

SUMMARY OF THE INVENTION

An object of the present invention is to resolve the above mentioned conventional problems and to provide a DC/DC converter which is operable at a low power source voltage and can be manufactured via an ordinary CMOS transistor manufacturing process other than a special transistor manufacturing process and thereby reducing the power consumption thereby.

Another object of the present invention is to provide a DC/DC converter which is operable with a voltage level determined by a single dry battery or the like and is suitable for forming into an integrated circuit.

Still another object of the present invention is to provide an audio device which is operable with a low voltage power source having a DC/DC converter which permits reduction in the power consumption thereby.

The DC/DC converter and the audio device according to the present invention which achieve the above objects comprises a MOS transistor which is inserted in parallel with respect to a load and between a power source feeding line from a battery to the load and a ground line; a first control circuit which generates a power of boosted voltage on said power source feeding line via switching of the MOS transistor, receives the power of boosted votage and controls the boosted voltage so as to be at a predetermined constant value in response to the boosted voltage; a bipolar transistor inserted in parallel with the MOS transistor; and a second control circuit which receives a power from the battery, causes switching of the bipolar transistor to generate the power of boosted voltage on said power source, feeding line, wherein when the boosted voltage is lower than an operable voltage of the first control circuit, the second control circuit is operated, and when the boosted voltage reaches equal to or more than the operable voltage, the operation of the second control circuit is stopped.

As will be understood from the above, when the boosted voltage which is fed to the load is lower than a voltage value which enables turning ON/OFF of the MOS transistor, a boosted voltage which is to be fed to the load is generated by switching the bipolar transistor, and after the timing when the boosted voltage becomes equal to or more than a voltage which enables operation of a switching control circuit for the MOS transistor, the MOS transistor is caused to operate and the switching operation at the side of the bipolar transistor is stopped. Thereby, during steady state operation the boosting is effected via the turning ON/OFF of the MOS transistor and the power consumption during no load period is suppressed and becomes low like the conventional device in a manner so substantially no current flows through the load.

Moreover, the bipolar transistor is operated via a power supply from the dry battery having a low power source voltage and for a short period, therefore even when the switching operation of the bipolar transistor is performed in this short period, the increase of the power consumption therein is insubstantial.

Since the operation of the MOS transistor is performed with a power of boosted high voltage, a MOS transistor having a high threshold voltage which is manufactured through the usual CMOS manufacturing process can be used as it is as in the conventional manner, and no special transistor manufacturing process which reduces the operating voltage of the MOS transistor is necessitated. Accordingly, the DC/DC converter according to the present invention is easily manufactured.

Further, since the DC/DC converter can be operated with a low power source voltage as well as the power consumption thereby during no load period is reduced, an operable time by a single battery is prolonged in comparison with a battery driven device in which a DC/DC converter is operated with a higher power source voltage.

BRIEF DESCRIPTION OF THE DRAWINGS

FIG. 1 is a block diagram of a portable type audio machine, primarily of the power source circuit thereof in which one embodiment of the DC/DC converters according to the present invention is applied.

DETAILED DESCRIPTION OF THE PREFERRED EMBODIMENT

In the drawing, numeral 1 is a portable type audio machine, numeral 2 is a DC/DC converter therefor, numeral 3 is an input terminal of the DC/DC converter 2 and is connected to a power source line Vcc for a battery 16. The power source line Vcc is connected to the positive terminal of the battery 16 via a switch 15. Numeral 4 is an output terminal of the DC/DC converter 2 and is connected to a power source feeding line 18 (Vcc$_1$) having an output voltage of 3.5 V. To the power source feeding line 18 loads such as an audio signal processing circuit 11, a motor drive circuit 12 and a control circuit 13 are respectively connected, and a motor (M) 14 is driven by the motor drive circuit 12.

To the input terminal 3 a power source feeding line 17 is connected and on the power source feeding line 17 between the input terminal 3 and the output terminal 4 a coil L and a diode D are successively connected in series. Between the junction of the coil L and the diode D and the ground GND an NPN type MOSFET transistor 5a serving as a switching transistor is disposed in an order of the drain and source. Further an NPN type bipolar transistor 5b likely serving as a switching transistor is disposed in parallel with the NPN type MOSFET transistor 5a in an order of the collector and emitter.

Further, between the output terminal 4 and the ground GND a capacitor C is disposed, still further in parallel with the capacitor C a resistor dividing circuit 6 constituted by resistors R$_1$ and R$_2$ is disposed. The voltage at the dividing point N of the resistor dividing circuit 6 is inputted to an error amplifier 7. The voltage at the dividing point N is compared with a reference voltage V$_R$ in the error amplifier 7, and the error component thereof is outputted as a voltage signal to an oscillation/driving circuit 8.

The oscillation/driving circuit 8, which is constituted, for example, by a voltage controlled variable frequency oscillator (VCO), receives the output voltage of the error amplifier 7 as a control signal and varies the frequency of the output signal in response to the control signal. The output of the oscillation/driving circuit 8 is sent out to the gate electrode of the MOS transistor 5a as a driving pulse having a predetermined pulse width (a pulse of which amplitude varies between HIGH level and LOW level).

As a result, the transistor 5a is turned ON/OFF in response to the output signal of the oscillation/driving circuit 8, and a feedback voltage generated at the coil L via the switching operation charges the capacitor C via the the diode D to generate a boosted voltage at the output terminal 4.

Herein, the frequency of the oscillation/driving circuit 8 which varies depending on the error signal varies in a direction wherein the voltage at the output terminal eliminates an error. When assuming that a control target voltage (a predetermined constant value) of the voltage at the output terminal 4 is Vcon and the frequency of the oscillation/driving circuit 8 at the voltage Vcon is a reference frequency, when the voltage at the output terminal 4 is lower than the target value Vcon, the oscillation frequency of the oscillation/driving circuit 8 becomes higher than the reference oscillation frequency, and when the voltage at the output terminal 4 is higher than the target value Vcon, the oscilation frequency of the oscillation/driving circuit 8 becomes lower than the reference oscillation frequency. As a result, the voltage at the output terminal 4 is controlled at a predetermined target value voltage Vcon (a constant value) in which the voltage at the voltage dividing point N coincides with the reference voltage V$_R$.

In the present embodiment, the error amplifier 7 and the oscillation/driving circuit 8 receive a power of boosted voltage from the output terminal 4 and operate using the same as a power source. When assuming that an operable voltage of the error amplifier 7 and the oscillation/driving circuit 8 is V$_S$ (wherein Vs<Vcon), the above mentioned switching control operation by the oscillation/driving circuit 8 is not caused until the voltage at the output terminal 4 reaches equal to or more than the voltage V$_S$ which permits operation of the error amplifier 7 and the oscillation/driving circuit 8.

Numeral 9 is an oscillation/starting circuit, and the power source feeding terminal Vcc thereof is connected to the power source feeding line 17 via a switching circuit 9a. Therefore, the oscillation/starting circuit 9 is operated upon receipt of a power supply from a dry battery 16 via the switching circuit 9a when the switching circuit 9a is turned ON and drives the bipolar transistor 5b to turn ON/OFF. A threshold voltage for turning ON/OFF the bipolar transistor 5b is usually about 0.5~0.8 V. Accordingly, with the output of the oscillation/starting circuit 9 which is operable with a power source voltage of 1.5 V the ON/OFF control of the bipolar transistor 5b can effected. The switching circuit 9a is normally in ON condition (normally closed) and is turned OFF upon receipt of a detection output of a comparator 10 which is explained later. Further, the oscillation/starting circuit 9 which can be operated at a low voltage less than 1.5 V is easily realized by an oscillation circuit constituted by a bipolar transistor.

Through the switching of the bipolar transistor 5b by the operation of the oscillation/starting circuit 9 a boosted voltage is generated as in the same manner in the above at the output terminal 4. At this instance the power source switch 15 inserted at the positive side of the dry battery 16 in series is in an ON state. The power source switch 15 is a manual switch which is turned ON, in that the power source is started. Therefore, since the switching circuit 9a is in an ON state, the operation of the oscillation/starting circuit 9 is initiated when the power source switch 15 is turned ON. Namely, the oscillation/starting circuit 9 receives a power supplied from the dry battery 16 at the moment of power source starting caused by turning on the power source switch 15 and performs the above operation.

The comparator 10 compares the voltage at the output terminal 4 with the reference voltage $V_{SR}$ to thereby turn OFF the switching circuit 9a. Herein, the comparison reference voltage $V_{SR}$ is equal to or more than the operable voltage $V_S$ of the error amplifier 7 and the oscillation/driving circuit 8 and is lower than the predetermined constant voltage Vcon. Namely, the relationship $V_S \leq V_{SR} < V_{CON}$ stands.

Therefore, when the comparator 10 generates a detection signal, the switching circuit 9a is turned OFF and the power supply to the oscillation/starting circuit 9 is interrupted, and the operation thereof is stopped. Thus, when the operation of the oscillation/starting circuit 9 has been stopped, the output thereof is rendered to LOW level and the bipolar transistor 5b is turned OFF, and the boosted voltage generated at the output terminal 4 at this moment is increased to a level sufficient to operated the error amplifier 7 and the oscillation/driving circuit 8.

Other than the respective circuits as explained above, the portable type audio machine is provided with an audio signal processing circuit 11 which receives the voltage boosted power supply from the DC/DC converter 2, a DC motor driving circuit (output circuit) 12 and a control circuit 13 constituted by such as a microcontroller and a ROM. The DC/DC converter 2 as explained above is usually formed into a single chip by itself, however the DC/DC converter 2 can be formed into single chip together with the audio signal processing circuit 11 and the DC motor driving circuit (output circuit) 12 or the circuit constituting such as the control circuit.

Now, the operation of the DC/DC converter 2 is explained.

When the power source switch 15 is closed, the oscillation/starting circuit 9 is fed of a power via the switching circuit 9a and with the oscillation output of the oscillation/starting circuit 9 the switching (ON/OFF) of the bipolar transistor 5b is performed. Thereby, a boosted voltage is generated at the output terminal 4 and of which voltage finally reaches to the voltage $V_S$. At this moment, both the error amplifier 7 and the oscillation/driving circuit 8 are operated and the switching (ON/OFF) of the MOS transistor 5a is performed to thereby further boost the voltage at the output terminal 4. When the voltage at the output terminal 4 reaches to the voltage $V_{SR}$, the switching circuit 9a is turned OFF by the detection output of the comparator 10 to stop the operation of the oscillation/starting circuit 9, thereby the bipolar transistor 5b is turned OFF to stop the switching operation of the transistor.

On the other hand, when the voltage at the output terminal 4 increases via the switching of the MOS transistor 5a and exceeds the voltage $V_S$, the error amplifier 7 generates an error signal in response to the voltage at the output terminal 4, thereby the frequency of the ON/OFF driving pulse is controlled so that the output voltage reaches to the target value voltage (constant voltage) Vcon.

As will be understood from the above description, other than when the power source is started the oscillation/starting circuit 9 is operated when the voltage at the output terminal 4 reduces below the detection reference $V_{SR}$ of the comparator 10 and the switching circuit 9a is turned ON. Accordingly, the oscillation/starting circuit 9 is not limited to a starting circuit which is operated only during the starting period but can be operated as a usual control circuit. The oscillation/starting circuit 9 can be also designed to operate only during the starting period by setting the reference voltage $V_{SR}$ lower than a lower limit voltage value of the output voltage at the output terminal 4 under a steady state condition which is controlled by the switching operation of the MOS transistor 5a. However, the reference voltage $V_{SR}$ in such instance is equal to or more than the operable voltage $V_S$ of the error amplifier 7 and the oscillation/driving circuit 8.

Further, the oscillation/starting circuit 9 can use a ring oscillation circuit as the oscillation circuit. The ring oscillation circuit (a semiconductor oscillation circuit) is a circuit which generates pulses of a predetermined cycle by shifting one bit via a ring counter constituted by a so called shift register.

In place of the oscillation/driving circuit 8, a PWM control circuit can be used which varies the width of pulses for driving the MOS transistor 5a depending on the output of the error amplifier 7. When the PWM control circuit is used as the oscillation/driving circuit 8, the PWM control circuit generates pulses whose widths vary depending on the error signal to turn ON/OFF the transistor 5a. Thereby a PWM switching regulation control is effected so that the output voltage reaches to the target value voltage Vcon. Such a PWM control circuit is easily constituted by a usual combination of a saw tooth wave generating circuit and a comparator.

Further, in the embodiment discussed, NPN type MOS transistor and the NPN type bipolar transistor serving as switching transistors are employed. However, PNP type transistors can be used and in such instance the ON/OFF relation of the PNP type transistors with respect to the driving pulses is inverted from that for the NPN type transistors.

We claim:

1. A DC/DC converter which receives a power from a battery, generates a power of a predetermined boosted voltage and supplies the same to a load comprising:

a MOS transistor provided in parallel with respect to a load and between a power source feeding line, connected to the load, and a ground line;

a first control circuit which generates a power of the boosted voltage on said power source feeding line via switching of said MOS transistor, receives the power of boosted voltage and controls the boosted voltage so as to be at a predetermined constant value in response to the boosted voltage;

a bipolar transistor provided in parallel with said MOS transistor; and a second control circuit which receives a power from the battery, causes switching of said bipolar transistor to generate a power of the boosted voltage on said power source feeding line, wherein when the boosted voltage is lower than an operable voltage of said first control circuit, said second control circuit is operated, and when the boosted voltage is equal to or more than the operable voltage, the operation of said second control circuit is stopped.

2. A DC/DC converter according to claim 1, wherein said second control circuit is a starting circuit which operates after starting the power source and boosts up the voltage of the power to be fed to the load until the voltage of said first control circuit is equal to or more than the operable voltage thereof.

3. A DC/DC converter according to claim 2, further comprising a detection circuit which detects that the boosted voltage exceeds the operable voltage and wherein in response to the output of said detection circuit, the operation of said starting circuit is stopped.

4. A DC/DC converter according to claim 3, further comprising a switching circuit of normally ON condition disposed at a power line through which said starting circuit receives a power from the battery and wherein in response to the turning OFF of said switching circuit by the output of said detection circuit, the operation of said starting circuit is stopped.

5. A DC/DC converter according to claim 3, wherein said detection circuit is a comparator which compares the boosted voltage with a reference voltage value $V_{RS}$ and when assuming the predetermined constant value as Vcon and the operable voltage $V_S$, a relation $V_S \leq V_{SR} < V_{con}$ is satisfied.

6. A DC/DC converter according to claim 3, wherein said starting circuit is an oscillation circuit which oscillates at a predetermined frequency and said MOS transistor and said bipolar transistor are both NPN type transistors.

7. A DC/DC converter according to claim 5, wherein said first control circuit includes an error amplifier and a first oscillation circuit, said error amplifier compares either the boosting voltage or a divided voltage thereof with the predetermined reference voltage and generates an error output in response to the differences thereof, said first oscillation circuit receives the error output, applies a driving pulse having a cycle depending on the error output to the gate electrode of said MOS transistor and controls the switching cycle, and said starting circuit is a second oscillation circuit which oscillates at a predetermined frequency.

8. A DC/DC converter according to claim 7, wherein said first oscillation circuit is a PWM control circuit which applies the driving pulse having a pulse width varying depending on the output of said error amplifier on the gate electrode of said MOS transistor.

9. An audio device having a DC/DC converter which receives a power from a battery, generates a power of a predetermined boosted voltage and supplies the same of an audio signal processing circuit comprising:

a MOS transistor provided in parallel with respect to said signal processing circuit and between a power source feeding line, connected to said signal processing circuit, and a ground line;

a first control circuit which generates a power of the boosted voltage on said power source feeding line via switching of said MOS transistor, receives the power of boosted voltage and controls the boosted voltage so as to be at a predetermined constant value in response to the boosted voltage;

a bipolar transistor provided in parallel with said MOS transistor; and a second control circuit which receives a power from the battery, causes switching of said bipolar transistor to generate a power of the boosted voltage on said power source feeding line, wherein when the boosted voltage is lower than an operable voltage of said first control circuit, said second control circuit is operated, and when the boosted voltage is equal to or more than the operable voltage, the operation of said second control circuit is stopped.

10. An audio device according to claim 9, further comprising a motor, a motor driving circuit which drives said motor upon receipt of the power of the boosted voltage and a detection circuit which detects that the boosted voltage exceeds the operable voltage, and wherein said audio device is used as a portable device, said second control circuit is a starting circuit which operates after the power source is started and boosts up the voltage of the power to be fed to the signal processing circuit until the voltage of said first control circuit is equal to or more than the operable voltage thereof and the operation of said starting circuit is stopped in response to the output of said detection circuit.

* * * * *